Patented May 30, 1933

1,911,477

UNITED STATES PATENT OFFICE

LOTHAR SONTAG, OF NORTH TONAWANDA, NEW YORK, ASSIGNOR TO GENERAL PLASTICS, INC., A CORPORATION OF NEW YORK

PLASTIC PHENOLIC RESIN COMPOSITION

No Drawing.  Application filed January 21, 1931.  Serial No. 510,277.

In the production of phenolic resins of the heat-hardening type, it is today customary to utilize plasticizing agents, but these agents are inert bodies, such as esters of the dialkyl phthalate type. These plasticizing agents do not combine chemically with the other ingredients, but apparently act by forming some sort of colloidal solution.

I have discovered that if a trialkyl ester of citric acid is incorporated with the phenolic resin of the type under discussion, it can be made to actually combine chemically with the resin and give a very desirable degree of plasticity. This is useful in connection with molding compounds, but is particularly important in the manufacture of varnishes, as my product will yield a film of unusual smoothness, toughness and flexibility.

Citric acid is a oxytricarboxylic acid and the ester of such an acid having three hydroxyl groups in conjunction with carboxylic groups seems to render this high boiling agent reactive with phenolic resin. While the amount of citric acid ester used may vary within wide limits as between 1% and 50%, I find that the best results are obtained if substantially less is used than is now the custom in connection with plasticizing agents such as dibutyl phthalate. For example, from one-third to one-half as much of my agent may be used as was formerly customary. For this purpose I may use the trimethyl- or the tripropyl-citrate, but prefer to use triethyl citrate.

The method of incorporation of these products in the resin either for use in molding compounds or for thermo-setting varnishes such as are used for laminating cloth, paper, etc. may vary according to the type of product desired, but I find it advantageous to incorporate the ester after the phenol and formaldehyde have reacted together in the presence of an alkaline catalyst to form phenol alcohol. After the ester is added, the reaction is continued preferably with heat and pressure until a resin of the desired consistency has been formed. This product can then be converted into a molding compound according to standard procedures or dissolved in spirit solvents to form a varnish. Of course, other forms of catalyst may be used and the ester may be introduced at other stages in the process.

Resin made according to my process when tested by distillation shows practically no volatile ester remaining so that I am convinced that this ester has actually reacted with the ingredients of the resin.

As it is well understood in the art, phenolic resins of the heat hardening type include those made from phenol and its homologues together with formaldehyde or substances adapted to engender formaldehyde. The same are intended to be included in the term "phenol formaldehyde resins" as used herein.

What I claim is:

1. A synthetic resin of the heat-hardening type consisting essentially of the reaction products of phenol, formaldehyde and an alkyl ester of citric acid.

2. A phenol formaldehyde synthetic resin which includes an alkyl ester of citric acid in combination with the other resin-forming ingredients.

3. A synthetic resin consisting essentially of the reaction products of a phenol and formaldehyde which have reacted in the presence of triethyl citrate.

4. The process of producing plastic phenolic resin compositions which comprises causing the reaction products of a phenol and formaldehyde to react with an alkyl ester of citric acid.

In testimony that I claim the foregoing, I have hereunto set my hand this 19th day of January, 1931.

LOTHAR SONTAG.